United States Patent [19]
Sato et al.

[11] 4,325,915
[45] Apr. 20, 1982

[54] BULK POLYMERIZATION REACTOR

[75] Inventors: Hiroshi Sato, Ichihara; Takehiko Okamoto, Nagoya; Akira Asada, Ikeda, all of Japan

[73] Assignee: Toray Industries, Inc., Japan

[21] Appl. No.: 134,520

[22] Filed: Mar. 27, 1980

[51] Int. Cl.$^3$ .............................................. B01J 19/18
[52] U.S. Cl. ................................... 422/135; 366/287; 366/313; 422/134; 422/138
[58] Field of Search .............. 422/131, 134, 135, 138; 366/287, 289, 279, 309, 313, 316, 98, 149

[56] References Cited

U.S. PATENT DOCUMENTS

| | | | |
|---|---|---|---|
| 3,486,865 | 12/1969 | Furusawa et al. | 422/135 |
| 3,855,404 | 12/1974 | Rotaru | 366/287 |
| 3,964,874 | 6/1976 | Maruko et al. | 422/135 |

FOREIGN PATENT DOCUMENTS 890215 2/1962 United Kingdom ................ 366/287

Primary Examiner—Michael S. Marcus
Attorney, Agent, or Firm—Lerner, David, Littenberg & Samuel

[57] ABSTRACT

A bulk polymerization reactor takes the form of a vertical, cylindrical vat of a jacket construction defining a reaction chamber which a rotary drive shaft having an off-center longitudinal section with perforated discs and shearing blades extends vertically through. Successful preclusion of abnormal stagnation of the liquid phase in the reaction chamber during polymerization avoids undesirable coloring in the product while assuring stable polymerization and high yield.

11 Claims, 3 Drawing Figures

BULK POLYMERIZATION REACTOR

BACKGROUND OF THE INVENTION

The present invention relates to improved bulk polymerization reactor.

Emulsion polymerization process, suspension polymerization process, solution polymerization process and bulk polymerization process have been known as methods for industrially produce plastics on the basis of highpolymer forming reaction. Which process should be chosen is partly dependent upon what purpose the produced plastics are used for.

In general, however, the choice is greatly influenced by how to remove the heat of reaction and/or how to cope with the viscous material which increases as the polymerization reaction develops.

Among these processes, the bulk polymerization process is most advantageous since its easiness in constructing a closed system assures saving of resources and energy, and less polution of environment. In order to practice this process successfully on an industrial level, various problems have to be solved such as instability in reaction, abnormal stagnation of material whose viscosity increases exponentially as the polymerization develops, and reduction in surface for removal of heat which inevitably follows enlargement in construction of the reactor. For these reasons, this process is applicable to very limited types of plastics when compared with emulsion polymerization process, suspension polymerization process and solution polymerization process.

In general, viscosity of the system increases as the bulk polymerization develops and big difficulty is experienced in properly handling highly viscous materials. That is, abnormal stagnant layers grow in the area near the wall of the reaction chamber and/or the rotary mixer shaft. Such stagnation in the liquid phase at high temperatures tends to eventuate in deterioration of polymers with low heat stability such as colouring and, in the worst case, carbonization. Polymer in the stagnant layers is involved in the polymer flows in the liquid phase and causes undesirable colouring of the normal polymer and/or inclusion of carbonized spot in the normal polymer, thereby seriously lowering the commercial value of the produced plastics.

In order to preclude formation of such stagnant layers, a screw mechanism has been proposed in order to peel off the polymer stagnating near the wall of the reaction chamber. Use of a suitable kneading mechanism has been proposed also. Use of such conventional mechanisms requires considerably increased consumption of electric power. In addition, their movements in the reaction chamber generate high friction heat which naturally escalates temperature in the liquid phase in the reaction chamber. Such raised temperature in the liquid phase promotes deterioration of polymers of low heat stability. In addition, control of polymerization process in general becomes very difficult.

It is also proposed to complete the reaction whilst keeping low viscosity of the liquid phase without raising the conversion of polymerization. This method enables elimination of difficulty in stably handling the highly viscous liquid to be otherwise encountered in bulk polymerization process. With this method, however, one cannot expect high yield and simple recovery of monomers.

The conventional bulk polymerization reactor is accompanied with a further problem, i.e. instability of reaction. Polymerization reaction is in general a kind of exothermic reaction and high viscosity of the system disables easy control of the heat of reaction, thereby causing formation of hot spots and/or uncontrolled development in polymerization.

SUMMARY OF THE INVENTION

It is one object of the present invention to successfully preclude stagnation of polymer in the material liquid phase during polymerization, thereby avoiding colouring of the product and/or inclusion of carbides in the product.

It is another object of the present invention to enable well controlled reaction in bulk polymerization.

In accordance with the present invention, a rotary mixer shaft includes an off-center longitudinal section to be placed in the material liquid phase and perforated discs and shearing blades are fixed to the off-center longitudinal section.

DESCRIPTION OF THE PREFERRED EMBODIMENT

Figure 1:
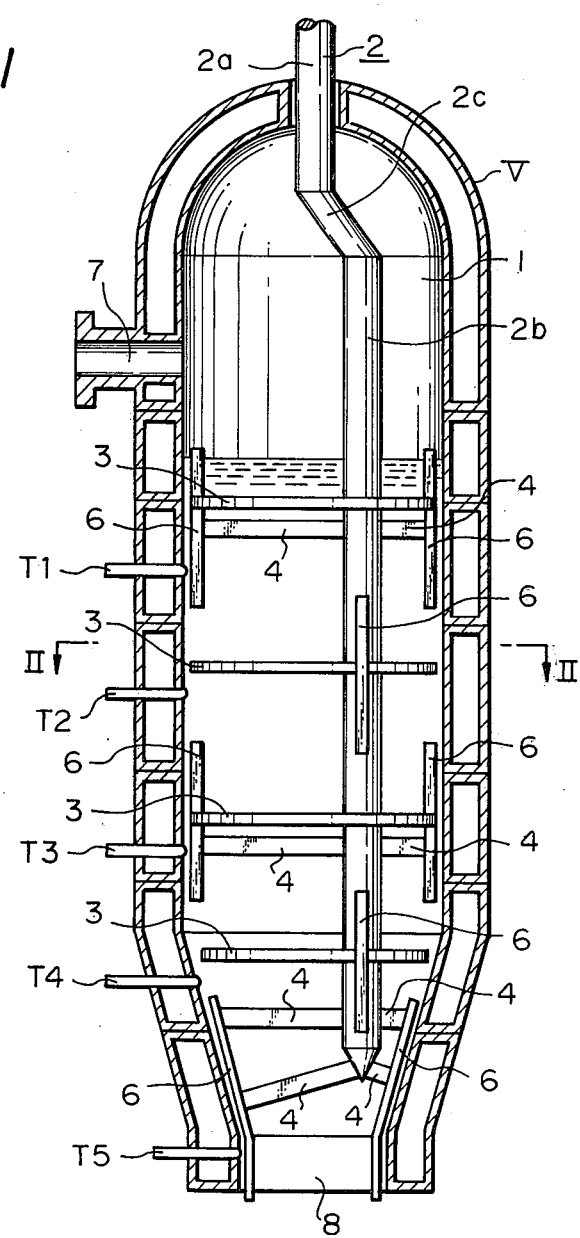
FIG. 1 is a side view, partly in section, of one embodiment of the bulk polymerization reactor in accordance with the present invention.

A typical embodiment of the improved bulk polymerization reactor in accordance with the present invention is shown in FIG. 1, in which the reactor takes the form of a vertical, cylindrical polymerization vat V of a jacket construction which internally defines a reaction chamber 1. Although not shown in the illustration, the jacket construction includes known heater and/or cooler equipment. The polymerization vat V is closed atop whilst allowing idle passage of a rotary shaft 2 which extends vertically towards the bottom of the reaction chamber 1.

The rotary shaft 2 includes a first longitudinal section 2a on the center axis A of the reaction chamber 1 and operationally coupled to a given drive source (not shown), a second off-center longitudinal section 2b which extends at least through the liquid phase within the reaction chamber 1, and a third longitudinal section 2c integrally connecting these two longitudinal sections 2a and 2b.

Figure 2:
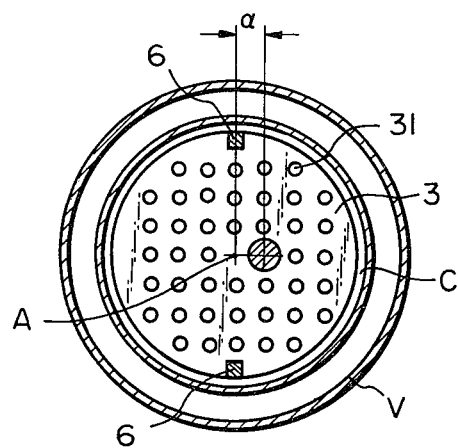
FIG. 2 is a section taken along the line II—II in FIG. 1.
Figure 3:
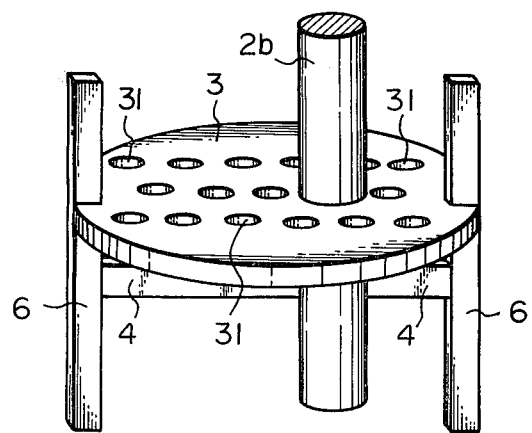
FIG. 3 is a perspective view of the perforated disc and its related parts used for the reactor shown in FIG. 1.

At properly selected levels in the liquid phase in the reaction chamber 1, a plurality of perforated discs 3 fixed horizontally to the off-center longitudinal section 2b of the rotary shaft 2. Although four sets of discs are used in the illustration, the number of the perforated disc can be selected freely in accordance with the process conditions in actual polymerization. Each disc 3 is provided with a number of apertures 31 formed there through. The diameter of each disc 3 is smaller than that of the corresponding section of the reaction chamber 1 so that slight cylindrical clearance C is left between the periphery of the disc 3 and the wall of the corresponding section of the reaction chamber 1 as clearly seen in FIG. 2.

At a position just below each perforated disc 3, a pair of opposite arms 4 extend radially from the shaft 2 and securedly hold, at their outer ends, shearing blades 6 which extend vertically over a prescribed distance. Preferably, the shearing blades 6 are fixed to the peripheral section of the associated disc 3 and a clearance should be left between the outer face of each blade 6 and the wall of the reaction chamber 1.

For balance of load on the rotary shaft 2, the vertical plane containing a pair of blades 6 at a certain level preferably offsets that containing a pair of blades 6 at an adjacent level. In the illustrated arrangement, the angle of offset is 90 degrees.

The polymerization vat V is further provided with a supply port 7 opening in the reaction chamber 1 near its top and a discharge part 8 arranged at its bottom.

The degree of eccentricity $\alpha$ of the off-center longitudinal section 2b of the shaft 2 from the center axis of the reaction chamber 1 (see FIG. 2) should preferably be 150% or smaller of the diameter of the off-center longitudinal section 2b, and more preferably in a range from 10 to 110% of the diameter of the off-center longitudinal section 2b.

Bulk polymerization was carried out in a reactor in which the rotary shaft had no off-center section, i.e. a reactor of the conventional type. In this case, it was confirmed after three days continuous running of the reactor that a stagnated layer grew considerably in the liquid place around the rotary shaft, and it mixed into the product in the forms of coloured phase and gell phase. As a consequence, the products were seriously deteriorated due to condesirable colouring and generation of numerous surface projections.

When the degree of eccentricity $\alpha$ exceeds 150%, no stable polymerization in the reactor can be expected.

The clearance between the outer face of the shearing blade 6 and the corresponding wall of the reaction should preferably be 60 mm. or smaller, and more preferably in a range from 5 to 25 mm.

There is no particular limit to the revolving speed of the shearing blades 6 as long as the speed is 1 RPM or larger. However, any revolving speed above 30 RPM tends to cause furious vertical mixing in the liquid phase which connects to unstable polymerization in the reactor and increased consumption of electric power.

The dimension of the shearing blades 6 should be designed so that the total shearing by the blades 6 should preferably cover 80% or more of the wall of the reaction chamber 1 in the liquid phase, and more preferably 101% or more.

When the shearing coverage is smaller than the abovedescribed limit, a stagnated layer grows along the wall section of the reaction chamber 1 which is not acted on by the blades 6, thereby causing mixing of undesirable coloured phase and generation of surface projections.

The total opening of each perforated disc 3 should preferably be in a range from 35 to 65% of the entire transverse cross section of the corresponding section of the reaction chamber 1. The presence of the perforated discs 3 well contributes maintenance of stable state of the liquid phase in the reactor, since the discs 3 greatly inhibit vertical mixing of the liquid phase in the reaction chamber 1.

Use of perforated discs of a total opening smaller than 35% may assure high conversion of polymerization such as 98%. However, continued running of a reactor with such perforated discs eventuates in formation of undesirably coloured products and gradual reduction in yield. Further, adherence of coloured polymer on the perforated discs is recognized after long running of the reactor.

As the total opening exceeds 65%, the pressure and temperature distribution within the reactor, and discharge of polymer are all disturbed greatly during bulk polymerization.

The perforated disc 3 is ordinarily provided with circular apertures 31 as shown in the drawings. However, apertures of any other shape such as a slit, a polygon or a sector are useful for the perforated disc of the present invention depending on the requirements in practice. Dimension of each aperture should be selected depending upon the viscosity of the liquid phase to be processed whilst taking the above-described total opening of the disc into account also.

EXAMPLE

EXAMPLE 1

Under presence of polybutadiene latex (FRS-2004 produced by The Firestone Tire & Rubber Company), styrene-acrylonitrile was subjected to batch polymerization at 65° C. for 6 hours in order to obtain graft-copolymer latex of polybutadiene with styrene-acrylonitrile. Polymerization was conducted following the particulars shown below and the conversion of polymerization was 95%.

| Particulars of the material | |
|---|---|
| Material | Part of weight |
| Polybutadiene latex (solid) | 70.0 |
| Styrene | 21.6 |
| Acrylonitrile | 8.4 |
| Tertiary dodecyl mercaptan | 0.15 |
| Sodium lauric acid | 1.50 |
| Dextrose | 0.5 |
| Cumene Hydroperoxide | 0.2 |
| Sodium pyrophosphoric acid | 0.3 |
| Ferrous sulfate | 0.01 |
| Ion-exchange water | 150.0 |

25 parts by weight of the latex in solid of the abovedescribed composition was mixed with 25 parts by weight of styrene monomer, and, after sufficient stirring of the mixture, 0.8 parts by weight of magnesium sulfate was further added. The mixed solution was divided into water and polymer/monomer phase, and the latter was mixed with 29 parts by weight of styrene monomer, 21 parts by weight of acrylonitrile monomer and 0.15 parts by weight of normal dodecyl mercaptan in order to obtain a uform solution, i.e. material dope.

The composition of this material dope was as follows;

| | |
|---|---|
| ABS | 25 parts by weight |
| Styrene monomer | 54 parts by weight |
| Acrylonitrile monomer | 21 parts by weight |
| Water | 10 parts by weight |

This material dope was subjected to preparatory bulk polymerization so that the resultant intermediate material was 50% by weight in solid and the latter was processed through the reactor shown in FIG. 1 to 95% conversion of polymerizate in order to continuously deliver ABS resin separated from the monomer.

Continuous bulk polymerization was carried out on a reactor of the particulars shown in the following table under the process conditions shown in the following table. As shown in FIG. 1, temperatures of the liquid phase in the reactor were measured at different levels of the reaction chamber 1 by means of thermometers T1 to T5.

| Particulars of the reactor | |
| --- | --- |
| Diameter of the reaction chamber 1. | 750 mm. |
| Diameter of the rotary shaft 2. | 150 mm. |
| Degree of eccentricity $\alpha$. | 50 mm. |
| Level of the liquid phase. | 2,355 mm. |
| Volume of the reaction chamber | 900 l. |
| Total opening of the perforated disc 3. | 51% |
| Diameter of the circular aperture 31. | 50 mm. |

| Particulars of the process | | |
| --- | --- | --- |
| Processing rate of the material dope. | | 150 kg/h |
| Internal pressure. | | 2.0 kg/cm$^2$G |
| Temperature. | T$_1$ | 120 ± 2° C. |
| | T$_2$ | 130 ± 2° C. |
| | T$_3$ | 160 ± 2° C. |
| | T$_4$ | 180 ± 2° C. |
| | T$_5$ | 200 ± 2° C. |

Polymerization was continued for about 240 hours under the above-described processing conditions in a very stable state. The resultant ABS pellets were provided with stable colour tone and physical properties as is clear from the following table.

| | |
| --- | --- |
| Melting viscosity | 4.0 × 10$^3$ poise (Measured by Flow Tester at the conditions of 220° C., 0.5 mm $\phi$ × 1.0 mm L, 50 kg/cm$^2$) |
| Tensile strength (ASTM D638-68) | 410 kg/cm$^2$ |
| Breaking elongation (ASTM D638-68) | 18% |
| Izod impact strength (ASTM D256-56) | 22 kg . cm/cm (with notch) |
| Yellowness Index (ASTM D1925-63T) | 26–28% |

Comparative Example 1

Using the material dope used in Example 1, polymerization was conducted following the particulars shown below.

| Particulars of the reactor | |
| --- | --- |
| Diameter of the reaction chamber. | 750 mm. |
| Diameter of the rotary shaft. | 150 mm. |
| Degree of eccentricity $\alpha$. | 0 mm. |
| Level of the liquid phase. | 2,355 mm. |
| Volume of the reaction chamber. | 900 l. |
| Total opening of the perforated disc. | 51% |
| Diameter of the circular aperture. | 50 mm. |

| Particulars of the process | | |
| --- | --- | --- |
| Processing rate of the material dope. | | 150 kg/h |
| Internal pressure | | 2.0 kg/cm$^2$G |
| Temperature | T$_1$ | 125 ± 2° C. |
| | T$_2$ | 137 ± 2° C. |
| | T$_3$ | 165 ± 2° C. |
| | T$_4$ | 188 ± 5° C. |
| | T$_5$ | 205 ± 7° C. |

After running of the reactor for about 70 hours, fluctuation in colour tone of the produced pellets started and presence of dark red spots was observed in the resin after about 150 hours of continuous running of the reactor. The physical properties of the produced resin were as follows;

| | |
| --- | --- |
| Melting viscosity | 4.0 × 10$^3$ poise (220° C., 0.5 mm $\phi$ × 1.0 mm L, 50 kg/cm$^2$) |
| Tensile strength | 410 kg/cm$^2$ |
| Breaking elongation | 16% |
| Izod impact strength | 20 kg . cm/cm (with notch) |
| Yellowness Index | 28–60% |

This result clearly indicates that the product obtained with the conventional reactor is by far inferior particularly in yellowing to that with the reactor in accordance with the present invention (Example 1). After end of the process, presence of a red coloured resin phase layer of about 10 mm thickness was observed on the section of the rotary shaft near the bottom of the reactor.

Comparative Example 2

Polymerization was carried out following the particulars shown below in a reactor same as that used in Example 1 with the only exception that the total opening of the perforated discs was 20%.

| Particulars of the process | | |
| --- | --- | --- |
| Processing rate of the material dope. | | 150 kg/h. |
| Internal pressure. | | 2.0 kg/cm$^2$G |
| Temperature | T$_1$ | 125 ± 2° C. |
| | T$_2$ | 140 ± 2° C. |
| | T$_3$ | 170 ± 2° C. |
| | T$_4$ | 195 ± 2° C. |
| | T$_5$ | 209 ± 2° C. |

The physical properties of the produced resin were as follows;

| | |
| --- | --- |
| Izod impact strength | 18–20 kg . cm/cm (with notch) |
| Yellowness Index | 35–45% |

It is clear from this result that too small total opening of the perforated disc connects to increased yellowing of the produced resin.

Comparative Example 3

Polymerization was carried out following the particulars shown below in a reactor same as that used in Example 1 with the only exception that the total opening of the perforated disc was 70%.

| Particulars of the process | | |
| --- | --- | --- |
| Processing rate of the material dope | | 150 kg/h |
| Internal pressure | | 2.0 kg/cm$^2$G |
| Temperature | T$_1$ | 125 ± 5° C. |
| | T$_2$ | 135 ± 5° C. |
| | T$_3$ | 165 ± 5° C. |
| | T$_4$ | 183 ± 10° C. |
| | T$_5$ | 205 ± 10° C. |

Disturbance in temperature distribution within the reactor was observed during the process and the obtained product was quite unstable in both physical properties and colour tone. The Izod impact strength was 18 to 24 kg.cm/cm (with notch) and the yellowness index was 23 to 32%.

We claim:

1. A bulk polymerization reactor comprising
   a vertically elongated cylindrical polymerization vat which defines a reaction chamber provided with a material supply port and a bottom product resin discharge port,
   a rotary shaft including an off-center longitudinal section vertically extending through said reaction chamber, said longitudinal section having a degree of eccentricity from the center axis of said reaction chamber of from about 10% to about 150%,
   a plurality of horizontal perforated discs fixed to said off-center longitudinal section of said rotary shaft, said perforated discs leaving a cylindrical clearance between their periphery and a corresponding wall section of said reaction chamber, and
   a plurality of shearing blades fixedly coupled to said off-center longitudinal section of said rotary shaft by means of an arm, each blade leaving a clearance between its outer face and a corresponding wall section of said reaction chamber.

2. A bulk polymerization reactor as claimed in claim 1, in which
   two or more pairs of said shearing blades are coupled at different levels to said off-center longitudinal section, and
   a first vertical plane containing a pair of shearing blades at a first level is offset with respect to a second vertical plane containing a pair of shearing blades at an adjacent level.

3. A bulk polymerization reactor for preparing a polymer product, said reactor comprising
   a vertically elongated cylindrical polymerization vat which defines a reaction chamber provided with a material supply port and a bottom product resin discharge port,
   a rotary shaft including an off-center longitudinal section vertically extending through said reaction chamber, said longitudinal section having a degree of eccentricity from the center axis of said reaction chamber of 150% or less, said degree of eccentricity being sufficient to avoid coloring of the polymer product and to avoid the inclusion of carbides in the polymer product,
   a plurality of horizontal perforated discs fixed to said off-center longitudinal section of said rotary shaft, said perforated discs leaving a cylindrical clearance between their periphery and a corresponding wall section of said reaction chamber, and
   a plurality of shearing blades fixedly coupled to said off-center longitudinal section of said rotary shaft by means of an arm, each blade leaving a clearance between its outer face and a corresponding wall section of said reaction chamber.

4. A bulk polymerization reactor as claimed in claim 3 in which
   two or more pairs of said shearing blades are coupled at different levels to said off-center longitudinal section, and
   a first vertical plane containing a pair of shearing blades at a first level is offset with respect to a second vertical plane containing a pair of shearing blades at an adjacent level.

5. A bulk polymerization reactor as claimed in claim 4 in which
   the angle of offset is 90 degrees.

6. A bulk polymerization reactor as claimed in claim 3 or 1 in which
   said degree of eccentricity is in a range from 10 to 110%.

7. A bulk polymerization reactor as claimed in claim 3 or 2 in which
   said second-named clearance is 60 mm, or smaller.

8. A bulk polymerization reactor as claimed in claim 7 in which
   said second-named clearance is in a range from 5 to 25 mm.

9. A bulk polymerization reactor as claimed in claim 3 or 4 in which
   the dimension of each said shearing blade is designed so that the total shearing by said shearing blades should cover 80% or more of the wall of said reaction chamber.

10. A bulk polymerization reactor as claimed in claim 3 or 4 in which
    the total opening of each said perforated disc is in a range from 35 to 65% of the entire transverse cross section of the corresponding section of said reaction chamber.

11. A bulk polymerization reactor according to claim 3, 4 or 2 in which the polymerization vat has a heating or cooling jacket surrounding the reaction chamber.

* * * * *